US011396951B1

(12) United States Patent
Hayes et al.

(10) Patent No.: US 11,396,951 B1
(45) Date of Patent: Jul. 26, 2022

(54) CHECK VALVE

(71) Applicant: PROCO PRODUCTS, INC., Stockton, CA (US)

(72) Inventors: Calvin C. Hayes, Sudbury (CA); Michael W. Lassas, Ripon, CA (US); James M. Gannatal, Woodbridge, IL (US); Heli Tusharkumat Trivedi, Chicago, IL (US)

(73) Assignee: Proco Products, Inc., Stockton, CA (US)

( * ) Notice: Subject to any disclaimer, the term of this patent is extended or adjusted under 35 U.S.C. 154(b) by 0 days.

(21) Appl. No.: 17/208,486

(22) Filed: Mar. 22, 2021

(51) Int. Cl.
*F16K 15/14* (2006.01)

(52) U.S. Cl.
CPC .................. *F16K 15/147* (2013.01)

(58) Field of Classification Search
CPC .................................... F16K 15/147

USPC ........................................ 137/846
See application file for complete search history.

(56) References Cited

U.S. PATENT DOCUMENTS

| 4,109,836 | A | * | 8/1978 | Falarde | B65D 47/2031 |
| | | | | | 137/849 |
| 4,585,031 | A | | 4/1986 | Raftis et al. | |
| 4,607,663 | A | | 8/1986 | Raftis et al. | |
| 5,727,593 | A | | 3/1998 | Duer | |
| 5,931,197 | A | | 8/1999 | Raftis et al. | |

* cited by examiner

*Primary Examiner* — P. Macade Nichols
(74) *Attorney, Agent, or Firm* — Greer, Burns & Crain, Ltd.

(57) ABSTRACT

A check valve has an inlet end, a transition part and an outlet end, with a pair of vertically orientated lips. The transition part is twisted about the axis extending from the inlet to the outlet. As fluid passes through the check valve, the twisted portion of the check valve will impart a swirling motion to the fluid as the fluids leaves the check valve via the outlet end.

19 Claims, 3 Drawing Sheets

CHECK VALVE

FIELD OF THE INVENTION

The invention relates to a check valve of the so-called "duckbill" type for use in drainage systems and effluent outfall lines. A typical duckbill check valve has an inlet, an outlet bill, and a transitional middle part for connecting the inlet and the outlet bill.

BACKGROUND OF THE INVENTION

Conventional rubber duckbill check valves attached to the end of an outlet pipe and include a pair of lips that open and close to allow fluid, usually liquid or liquid with solids therein, to flow therethrough. Such duckbill check valves are shown in U.S. Pat. Nos. 4,607,663 and 4,585,031. Another duckbill check valve is shown in U.S. Pat. No. 5,727,593.

While these valves are presumably effective for their intended purposes, such valves have a straight transition area between the inlet end of the check valve to the pair of lips at the outlet of the check valve. This configuration provides a relatively straight distribution of fluid out of the check valve. However, in some configurations, for example when the check valve is in a tank, reservoir, or water tower, it may be desirable to mix the fluid exiting the check valve with the other fluid in the tank. Conventional designs are not configured for consistently achieving such mixing.

Therefore, it would be desirable to provide a duckbill check valve that increases the ability of the fluid exiting the check valve to mixing and blend.

BRIEF SUMMARY OF THE PRESENT INVENTION

The present invention overcomes one or more drawbacks by providing a check valve that imparts a torsional flow to the fluids in standpipes, reservoirs, water towers and other vessels. This flow will increase the ability of the exiting fluid to blend/mix with other fluids in the vessel and provide a higher ratio of blending/mixing of fluids. This will also more rapidly mix/blend hot and cold in a tank due to the twisting motion of the dispensing fluids. These improvements may reduce the need to rely on pumps and other energy consuming equipment to ensure proper blending in the vessels. The check valve includes a portion which is twisted about the axis extending from the inlet to the outlet. Thus, as fluid passes through the check valve, the twisted portion of the body will impart a swirling motion and be forced to leave the valve via the torsional twisted lip section of the valve.

Accordingly, in a first aspect the present invention may be characterized as providing a check valve which includes an inlet end, an outlet end, and a transition part located between the inlet end and the outlet end. The inlet end is configured to engage a conduit and the outlet end includes a pair of lips. The transition part is configured to provide fluid exiting the outlet end with a swirling motion. The transition part may be twisted. The check valve may be formed from an elastomer, and specifically an ANSI/NSF-61 elastomer. The check valve may include polyurethane, and specifically an ANSI/NSF-61 polyurethane. The inlet end may include a flange. The flange may be integrally formed with the inlet end. A length of the pair of lips may be larger than an inner diameter of the inlet end. A length of the pair of lips may be equal to an inner diameter of the inlet end.

In another aspect, the present invention may be broadly characterized as providing a check valve that includes an inlet end, an outlet end, and a transition part located between the inlet end and the outlet end. The outlet end includes a pair of lips configured to open and close in order to start and stop a flow of fluid out of the check valve through the outlet end. The transition part may be twisted to provide the fluid exiting the outlet end with a swirling motion. The inlet end may include a flange. A length of the pair of lips may be larger than an inner diameter of the flange. A length of the pair of lips may be equal to an inner diameter of the flange. The flange may be integrally formed with the inlet end. The check valve may be formed from an elastomer, and specifically an ANSI/NSF-61 elastomer. The check valve may be polyurethane, and specifically an ANSI/NSF-61 polyurethane.

In a third aspect of the present invention, the present invention may be generally characterized as providing a check valve which includes an inlet end, an outlet end, and a transition part located between the inlet end and the outlet end. The outlet end includes a pair of lips configured to open and close in order to start and stop a flow of fluid out of the check valve through the outlet end. The inlet end includes an integrally formed flange. The transition part is twisted to provide the fluid exiting the outlet end with a swirling motion. A length of the pair of lips may be at least equal to an inner diameter of the flange. The flange may be integrally formed with the inlet end. The check valve may be formed from an elastomer, and specifically an ANSI/NSF-61 elastomer. The check valve may be polyurethane, and specifically an ANSI/NSF-61 polyurethane.

These and other aspects and embodiments of the present invention, which may be combinable in any aspect or manner, will be appreciated by those of ordinary skill in the art based upon the following description of the drawings and detailed description of the preferred embodiments.

BRIEF DESCRIPTION OF THE DRAWINGS

The attached drawings will make it possible to understand how the invention may be produced and practiced by those of ordinary skill in the art.

DETAILED DESCRIPTION OF THE PRESENT INVENTION

As mentioned above, a new check valve has been invented which provides a swirling motion to fluids exiting the check valve. Accordingly, with reference the attached drawings, one or more embodiments of the present invention will now be described with the understanding that the described embodiments are merely preferred and are not intended to be limiting.

Figure 1:
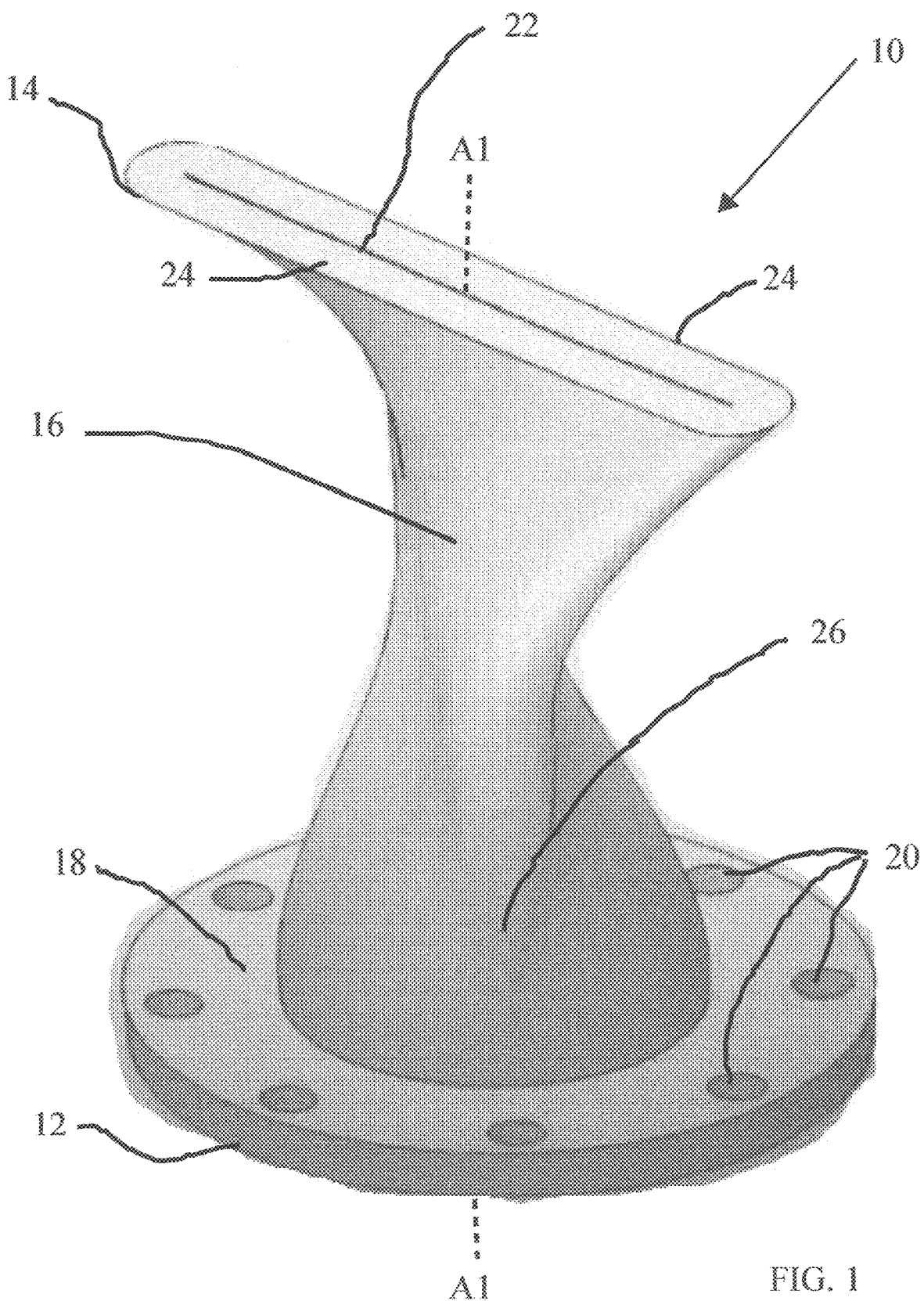
FIG. 1 is a side perspective view of a check valve according to one or more embodiments of the present invention.
Figure 2:
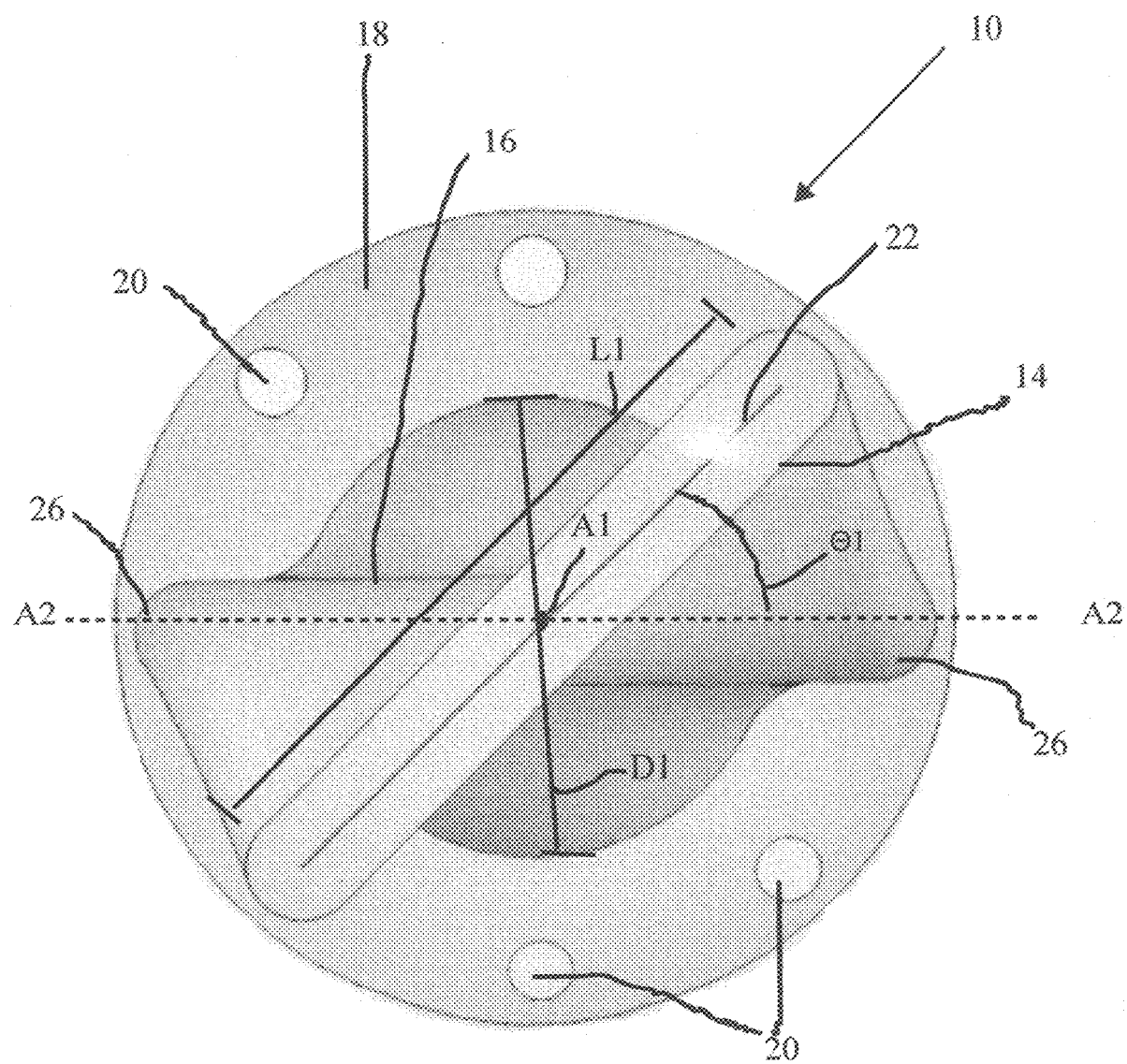
FIG. 2 is another side perspective view of the check valve shown in FIG. 1.

With reference to FIGS. 1 and 2, a check valve 10 according to one or more embodiments is shown. The check valve 10 is typically mounted on an outlet pipe (not shown) or conduit and includes an inlet end 12, outlet end 14, and a transition part 16. The check valve 10 is preferably made from National Sanitation Foundation approved urethane (for example, NSF-61) or an ANSI/NSF-61 elastomer, such as neoprene, or elastomer reinforced with synthetic fabric, such as nylon or polyester, with construction similar to an automobile tire.

The check valve 10 may be provided with local reinforcements, such as embedded pads of high durometer rubber, high strength synthetic fabric, metal plates, wires, etc. Additionally, the hardness of the material for the check valve 10 may be selected based on its hardness which can be tailored to ensure the desired mixing and dispersion rate based on the size of the check valve 10 and/or vessel.

In the embodiment shown in FIGS. 1 and 2, the inlet end 12 includes a flange 18 that may be secured to a flange on the outlet pipe (not shown) via a plurality of fasteners, such as bolts and nuts, which extend through apertures 20 in the flange 18. The flange 18 is preferably integrally formed with the rest of the check valve 10. Additionally, a second, backing flange (not shown), separate from the check valve 10, may be provided. The backing flange is preferably formed from 316 stainless steel or a plastic and may be used to provide additional strength or surface protection for the flange 18.

Alternatively, instead of the flange 18, it is contemplated that the inlet end 12 of the check valve 10 includes a cuff sized to surround the outlet pipe. Such an inlet end 12 is known in the art.

The outlet end 14 of the check valve 10, opposite the inlet end 12, includes a slit 22 formed between two lips 24. A length L1 of the lips 24 is preferably equal to or larger than an inner diameter D1 of the opening in the flange 18 (or the outer diameter of the outlet pipe).

The lips 24 are depicted in a closed orientation in which the lips sealingly engage each other over their length L1 and prevent fluid from leaving the check valve 10 through the slit 22. In response to sufficient pressure from fluid within the check valve 10, the lips 24 will move apart from each other and into an open orientation. In the open orientation, the fluid within the check valve 10 flows out of the check valve 10 through the slit 22. When the fluid flow ceases, or the pressure is insufficient to overcome the resiliency of the lips 24, the lips 24 will move toward each other and return to the closed orientation.

According to the present invention, the transition part 16 is configured to provide fluid exiting the outlet end 14 with a swirling or rotational motion. As shown in FIGS. 1 and 2, the transition part 16 is twisted to provide the fluid with the swirling motion as it exits the check valve 10 at the outlet end 14. By "twisted" it is meant that the slit 22 is rotated around an axis A1-A1, as shown in FIGS. 1 and 2, extending from the inlet end 12 to the outlet end 14.

More specifically, in the transition part 16, as the shape of the inner surface of the check valve 10 begins to change from a cylinder to the lips 24, two pinch points 26 are formed in the transition part 16. Accordingly, when viewed along the axis A1-A1 or when looking at the slit 22, the slit 22 is twisted 45 degrees, Θ1 relative to a line A2-A2 extending through the two pinch points 26. It is contemplated that the slit 22 may be twisted between 1 and 89 degrees, with a 45 degree rotation being the norm.

Figure 3:
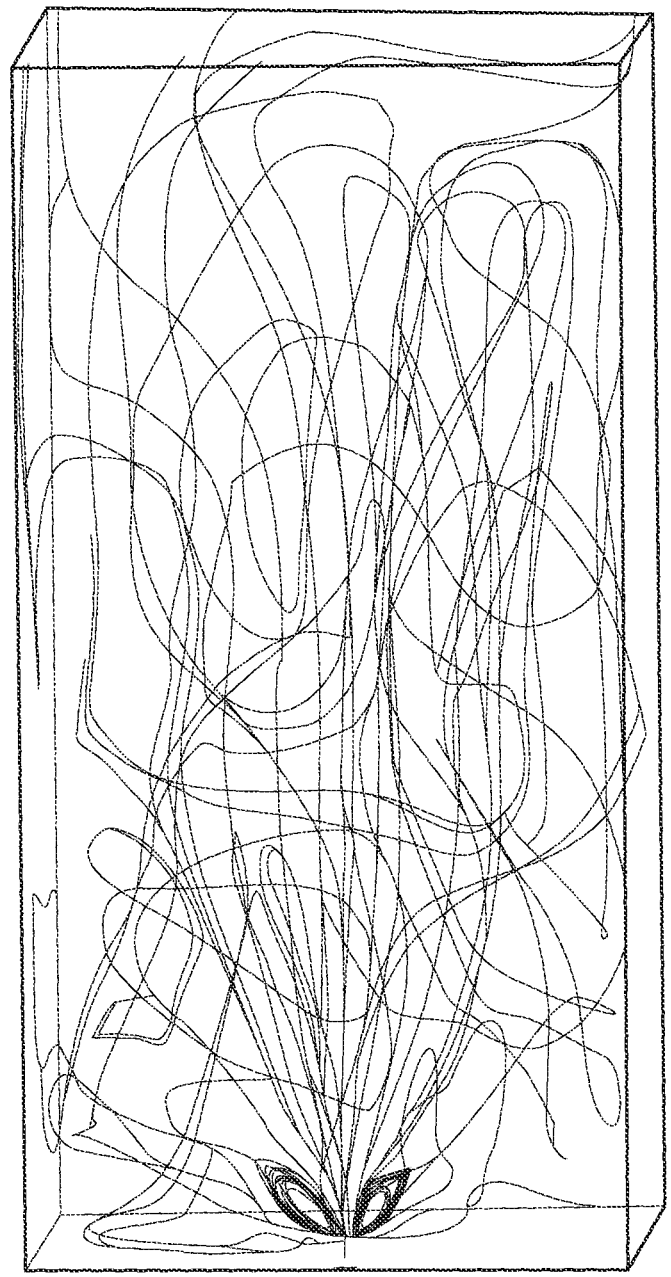
FIG. 3 is a theoretical flow modeling diagram for a check valve according to the present invention.

Inside of the check valve 10, as fluid moves through the transition part 16, the twisting of the surface of the transition part 16 will direct or guide the fluid to follow the twisting as it moves towards the outlet end 14. Thus, when the fluid ultimately exits the check valve 10, via the slit 22, the fluid will continue moving along the twisting direction and have a swirling or rotational motion. This swirling motion of the exiting fluid will increase and, as shown in FIG. 3, is believed to improve the mixing of the exiting fluid with fluid already within the vessel containing the check valve 10.

In sum, the present check valve 10 may be used in installations where it is desired to mix the exiting fluid and disperse it into a vessel containing the check valve 10. By providing the exiting fluid with a twisting or rotational movement, the mixing of the two fluids is improved. This improved mixing may reduce or even eliminate the need for pumps or other devices that mix the two fluids together.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The invention claimed is:

1. A check valve, comprising:
an inlet end and an outlet end, the inlet end configured to engage a conduit and the outlet end comprising a pair of lips; and,
a transition part located between the inlet end and the outlet end; and,
wherein the transition part is configured to provide fluid exiting the outlet end with a swirling motion,
wherein a length of the pair of lips is larger than an inner diameter of the inlet end.

2. The check valve of claim 1, wherein the transition part is twisted.

3. The check valve of claim 1, wherein the check valve is formed from an ANSI/NSF-61 elastomer.

4. The check valve of claim 1, wherein the check valve comprises ANSI/NSF-61 polyurethane.

5. The check valve of claim 1, wherein the inlet end comprises a flange.

6. The check valve of claim 5, wherein the flange is integrally formed with the inlet end.

7. A check valve, comprising:
an inlet end and an outlet end, the outlet end comprising a pair of lips configured to open and close in order to start and stop a flow of fluid out of the check valve through the outlet end; and,
a transition part located between the inlet end and the outlet end, wherein the transition part is twisted between 1 and 89 degrees to provide the fluid exiting the outlet end with a swirling motion.

8. The check valve of claim 7, wherein the inlet end comprises a flange.

9. The check valve of claim 8, wherein a length of the pair of lips is larger than an inner diameter of the flange.

10. The check valve of claim 8, wherein a length of the pair of lips is equal to an inner diameter of the flange.

11. The check valve of claim 8, wherein the flange is integrally formed with the inlet end.

12. The check valve of claim 8, wherein the check valve is formed from an ANSI/NSF-61 elastomer.

13. The check valve of claim 8, wherein the check valve comprises ANSI/NSF-61 polyurethane.

14. A check valve, comprising:
an inlet end and an outlet end, the outlet end comprising a single pair of lips configured to open and close in order to start and stop a flow of fluid out of the check valve through the outlet end, and the inlet end comprising an integrally formed flange; and, a transition part located between the inlet end and the outlet end, wherein the transition part is twisted to provide the fluid exiting the outlet end with a swirling motion.

15. The check valve of claim 14, wherein a length of the pair of lips is at least equal to an inner diameter of the flange.

16. The check valve of claim 14, wherein the flange is integrally formed with the inlet end.

17. The check valve of claim 14, wherein the check valve is formed from an ANSI/NSF-61 elastomer.

18. The check valve of claim 14, wherein the check valve comprises ANSI/NSF-61 polyurethane.

19. The check valve of claim 14, wherein the integrally formed flange comprises a plurality of apertures.

\* \* \* \* \*